US011484800B2

(12) United States Patent
Ng

(10) Patent No.: US 11,484,800 B2
(45) Date of Patent: Nov. 1, 2022

(54) METHODS AND SYSTEMS FOR FILTERING CONTENT IN RECONSTRUCTIONS OF NATIVE DATA OF ASSETS

(71) Applicant: GGWP, Inc., Hillsborough, CA (US)

(72) Inventor: George Ng, Hillsborough, CA (US)

(73) Assignee: GGWP, Inc., Hillsborough, CA (US)

(*) Notice: Subject to any disclaimer, the term of this patent is extended or adjusted under 35 U.S.C. 154(b) by 0 days.

(21) Appl. No.: 17/139,829

(22) Filed: Dec. 31, 2020

(65) Prior Publication Data
US 2022/0203243 A1    Jun. 30, 2022

(51) Int. Cl.
| | | |
|---|---|---|
| *A63F 13/75* | (2014.01) | |
| *A63F 13/79* | (2014.01) | |
| *G06Q 50/00* | (2012.01) | |
| *G06N 20/00* | (2019.01) | |
| *A63F 13/67* | (2014.01) | |
| *A63F 13/497* | (2014.01) | |
| *A63F 13/5375* | (2014.01) | |
| *G07F 17/32* | (2006.01) | |

(52) U.S. Cl.
CPC ............ *A63F 13/75* (2014.09); *A63F 13/497* (2014.09); *A63F 13/5375* (2014.09); *A63F 13/67* (2014.09); *A63F 13/79* (2014.09); *G06N 20/00* (2019.01); *G06Q 50/01* (2013.01); *G07F 17/3237* (2013.01); *G07F 17/3241* (2013.01); *A63F 2250/58* (2013.01); *A63F 2300/535* (2013.01); *A63F 2300/5586* (2013.01)

(58) Field of Classification Search
None
See application file for complete search history.

(56) References Cited

U.S. PATENT DOCUMENTS

| | | | |
|---|---|---|---|
| 8,949,535 B1 | 2/2015 | Hunter | |
| 10,417,650 B1 | 9/2019 | Gong | |
| 10,545,492 B2 | 1/2020 | Billi-Duran et al. | |
| 11,253,785 B1* | 2/2022 | Niknafs | A63F 13/335 |
| 2008/0096663 A1* | 4/2008 | Lieberman | A63F 13/497 463/42 |
| 2009/0111583 A1* | 4/2009 | Zalewski | A63F 13/497 463/42 |
| 2010/0222140 A1* | 9/2010 | Dewaal | G07F 17/3293 463/43 |
| 2014/0243077 A1* | 8/2014 | Choi | A63F 13/822 463/29 |
| 2014/0287826 A1* | 9/2014 | Zhao | A63F 13/75 463/29 |
| 2015/0072775 A1* | 3/2015 | McDonald | G07F 17/3241 463/29 |

(Continued)

OTHER PUBLICATIONS

Office Action dated Feb. 22, 2021, issued in U.S. Appl. No. 17/139,855 (13 pages).

*Primary Examiner* — Jason T Yen
(74) *Attorney, Agent, or Firm* — Perkins Coie LLP

(57) ABSTRACT

Methods and systems for generating incident recommendations in processed data using machine learning models. Specifically, the methods and system extract telemetry data from native game data. By reducing game data to telemetry data only, the system may reduce the amount of data that must be stored and processed. The system reconstructs game data in order to generate an incident recommendation. This reconstructed data allows for manual user review and/or understanding the context of an incident.

22 Claims, 11 Drawing Sheets

(56) References Cited

U.S. PATENT DOCUMENTS

| | | |
|---|---|---|
| 2015/0213372 A1 | 7/2015 | Shah et al. |
| 2015/0381552 A1 | 12/2015 | Vijay et al. |
| 2017/0195854 A1 | 7/2017 | Shi-Nash et al. |
| 2019/0130037 A1 | 5/2019 | Guo et al. |
| 2019/0291008 A1* | 9/2019 | Cox ........................ A63F 13/79 |
| 2021/0402304 A1* | 12/2021 | Dorn ....................... G06N 20/00 |
| 2022/0032199 A1* | 2/2022 | Rudi ....................... A63F 13/75 |

* cited by examiner

300

Home

Summary  Scoreboard  Timeline  Performance

| Individually Sorted | Avg Combat Score | KCA | Econ | First Bloods | Plants | Defuses |
|---|---|---|---|---|---|---|
| Goodseed | 271 | 45/35/18 | 50 | 4 | 5 | 1 |
| Cheatcode | 263 | 49/33/6 | 47 | 5 | 0 | 0 |
| Wez | 243 | 42/35/10 | 42 | 6 | 2 | 2 |
| Bless | 237 | 41/38/0 | 44 | 5 | 0 | 0 |
| Kcybear | 234 | 34/39/16 | 42 | 7 | 0 | 0 |
| Jkim | 187 | 33/36/16 | 35 | 4 | 2 | 3 |
| Modiggo | 175 | 29/39/10 | 34 | 5 | 4 | 0 |
| oBacon | 173 | 30/26/8 | 38 | 7 | 0 | 0 |
| BigPapa K | 158 | 27/39/11 | 30 | 2 | 7 | 0 |
| dior | 154 | 25/37/15 | 29 | 5 | 2 | 2 |

New Reputation Reward!
Congrats, you've unlocked your next reputation reward!

Back

Party

FIG. 3

METHODS AND SYSTEMS FOR FILTERING CONTENT IN RECONSTRUCTIONS OF NATIVE DATA OF ASSETS

FIELD OF THE INVENTION

The invention relates to detecting, reporting, and/or responding to anti-social gameplay in video game environments.

BACKGROUND

The video game industry is an economic sector involved in the development, marketing, and monetization of video games. This economic sector has grown exponentially in recent years with the sale of video games alone generating sales of over one hundred billion dollars annually. A significant part of this growth is due to the accessibility of video games, both in terms of the number of people that may participate, and the number of ways to engage with video games. For example, video games are routinely moving to online, free-to-play, and/or multiplayer formats, and may be accessed from a plurality of devices, such as computers, gaming consoles, and mobile devices. Furthermore, video game environments are increasingly becoming social media environments as video games incorporate functions such as friend groups, chat features, and/or peer-to-peer interactive environments. In fact, video game environments are commonly referred to as a "gaming community," which reflects the growing interpersonal interactions of "users" (i.e., video game players and/or participants).

With the exponential growth in the gaming community, however, a new cultural phenomenon has developed—"gaming toxicity." Gaming toxicity is used to describe the abusive and/or anti-social behavior found in gaming communities, as well as user behavior while gaming. Characteristics of gaming toxicity include emotional outbursts, bullying (including abusive, threatening and/or offensive remarks), selfish in-asset actions and playstyles, and/or other anti-social in-asset and out-of-asset activity. Furthermore, these characteristics, which may include racism, misogyny, and/or death threats in-asset, may also lead to out-of-asset toxicity. For example, the computer-based and information-rich environment of gaming (e.g., IP addresses, screennames, social media accounts, etc.) can allow members of the gaming community to identify, contact, harass, and/or visit users out-of-asset via out-of-asset means, such as telephone calls, emails, etc. In fact, the toxicity of the gaming environment coupled with the accessibility of information on users (and/or the ability to identify out-of-asset information on users) has led to the cultural phenomenon of "doxing," in which hackers dig up personal information and documents to expose the real identities of people hoping to remain anonymous, typically with the intent to annoy, harass, and/or threaten. Even more troubling, is the increase in "swatting" by one user towards another. Swatting is the act of creating a hoax 911 call, typically involving hostages, gunfire, or other acts of extreme violence, with the goal of diverting emergency public safety resources to an unsuspecting person's residence, which in some instances has resulted in the death of users at the hands of the emergency public safety resources.

While anti-social behavior exists in other communities, gaming toxicity is particularly prevalent, and leads to the extreme examples above, due to the nature of the gaming community. One contributing factor is that the gaming community includes a competitive element (e.g., which emphasizes victory over everything else and causes enjoyment to be correlated with besting the competition). Community members are anonymous, as users often go by aliases (e.g., user screennames, which may vary for different assets, and which are not tied to any centralized username or account). Gaming also breeds a psychological phenomenon known as counterfactual thinking, which triggers people to blame others. For example, if unwanted things happened, a person tends to imagine an alternate event (e.g., if a teammate had been slightly better, the team would have already won). The gaming community also suffers from a negative social culture. For example, gaming communities often reflect an individualist society (e.g., users value his/her gaming experience as an individual experience, which differs from, and is uncorrelated to the experience of others). This leads to a lack of empathy, and potentially an enjoyment of the suffering of others.

SUMMARY

Accordingly, methods and systems are described herein for detecting, reporting, and/or responding to gaming toxicity in video game environments. Moreover, the methods and systems are specifically tailored to address the unique characteristics and nature of the gaming community as described above. In many instances, this requires the methods and systems to also address the technical challenges unique to the gaming community and video gaming in general, as described below.

For example, the video game industry, which is based on individual assets, is by its nature a distributed environment. As opposed to a social media platform where a user may have a single social media account, a single user may have a different account, user profile, and/or screenname for each asset. There is currently no mechanism for coordinating between individual video games, video game developers, and/or others in the video game community to create a cross-platform user profile (e.g., a profile that may be used across assets, platforms, and/or user accounts) to detect, report, and/or respond to incidents of user toxicity. However, even beyond this initial hurdle, several technical hurdles related to detecting, reporting, and/or responding to toxic gameplay in video game environments remain.

For example, unlike other forms of incident detection and reporting (e.g., as found in social media platforms), video games produce exponentially more content. Where a social media platform may produce text posts and/or short, posted videos, video games generate a constant stream of multimedia data. Conventional systems have no mechanism for storing this data. Accordingly, conventional video game systems store only analytic data (e.g., for use in tracking user demographics, spending habits, and time spent playing assets). Because of this lack of storage, conventional systems must rely on other users to report incidents of toxicity as the incidents occur (e.g., during or immediately after an interaction is concluded). This form of manual user-based reporting is fundamentally flawed, as it underreports toxicity (e.g., most incidents go unreported), and manual, user-based reporting may in fact lead to more toxicity and a high number of false positives (e.g., users fraudulently reporting other users as a mechanism for harassment).

In another example, conventional systems have no mechanism for filtering video game data for objectionable content. While social media platforms may perform keyword searches of posted content for objectionable words or phrases, such keyword searches are inapplicable with video game data. Moreover, many incidents of toxicity are context specific. That is, as opposed to simply recognizing an image in data, to detect toxic incident in video games, the system may need an understanding of the context of the gameplay, which may be based on many factors. For example, the toxicity of incidents (or whether a user engaged in toxic behavior) may be dependent on the asset, genre, and/or type of asset in which the conduct occurred (e.g., toxic behavior in a first-person shooter may be different than toxic behavior in a farm simulation asset, as the assets may have different player bases, and thus different mores and social aspects. Additionally, the toxicity of an incident may also depend on the relationships (or lack thereof), ages, and/or other demographics of the users (e.g., the context of a comment may change if the comment was exchanged between close friends, between an adult and a child, etc.). The current atmosphere of the asset, or current scenario within an asset may also affect whether an incident is toxic (e.g., bad language that is otherwise unacceptable may be acceptable during a tense moment in a survival horror asset).

Finally, even after the context of the incident is determined, the system still needs a mechanism for evaluating whether a toxic incident took place. Conventional systems have no mechanism for this. For example, in contrast to objectionable language in social media posts, which is static in nature, detecting toxic gameplay may requires an analysis of a dynamic situation. For example, detecting toxic gameplay such as spamming other users (e.g., repeatedly using the same item or action to the detriment of the other users) may require determining the in-asset positions of multiple other users, evaluating their actions/movements relative to each other, and/or understanding the in-asset relevancy of those actions/movements.

In view of the methods and system for generating incident recommendations in processed data are described. These methods and system overcome the technical hurdles discussed above. For example, an initial technical barrier to introducing this system is accessing and retaining game data as most game providers store data for only a short period of time (whereas detecting incidents and trends may require two years of data). Moreover, the game data that is stored focuses on user profiling for advertisement and monetary purposes (e.g., what items were purchased, etc.), in-game achievements (e.g., what in-game goals/scores were achieved), social connections (e.g., "friend lists", guilds, etc.). Additionally, while known incident recommendations may be stored, these are only generated in response to manually reported incidents. Finally, actual game play (e.g., "movie modes") are only stored at the request of the user and are not filtered for privacy concerns (e.g., personal information, personal audio information, etc.).

The system overcomes these issues by first extracting only some of the game data (e.g., telemetry data). By reducing game data to telemetry data only, the system may reduce the amount of data that must be stored and processed. However, while telemetry data may be all that is needed by a machine learning model to detect incidents and provides lower data storage and processing issues, telemetry data poses an issue for manual review (e.g., review of a detected incident by a user). Accordingly, the system reconstructs game data in order to generate an incident recommendation. This reconstructed data allows for manual user review and/or understanding the context of an incident.

In some aspects, methods and systems for generating incident recommendations in processed data using machine learning models. For example, the system may receive native asset data. The system may extract telemetry data from the native asset data. The system may store the telemetry data. The system may detect an incident based on an output from a machine learning model, wherein the machine learning model is trained to detect known incidents in training data comprising labeled telemetry data. The system may, in response to detecting the incident, generating reconstructed asset data based on the telemetry data. The system may generate for presentation, in a user interface, an incident recommendation comprising the reconstructed asset data.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 3 shows an illustrative user interface for providing in-asset features based on a cross-platform profile, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Additional or alternative embodiments are also disclosed in U.S. patent application Ser. No. 17/139,843, entitled "Methods and Systems for Generating Multimedia Content Based on Processed Data with Variable Privacy Concerns," U.S. patent application Ser. No. 17/139,849, entitled "Methods and Systems for Cross-Platform User Profiling Based on Disparate Datasets Using Machine Learning Models," U.S. patent application Ser. No. 17/139,855, entitled "Methods and Systems for Detecting Disparate Incidents in Processed Data Using a Plurality of Machine Learning Models," and U.S. patent application Ser. No. 17/139,864, entitled "Methods and Systems for Generating Multimedia Content Based on Processed Data with Variable Privacy Concerns," each of which was filed on Dec. 31, 2020, and each of which is incorporated herein by reference in its entirety.

Figure 1:
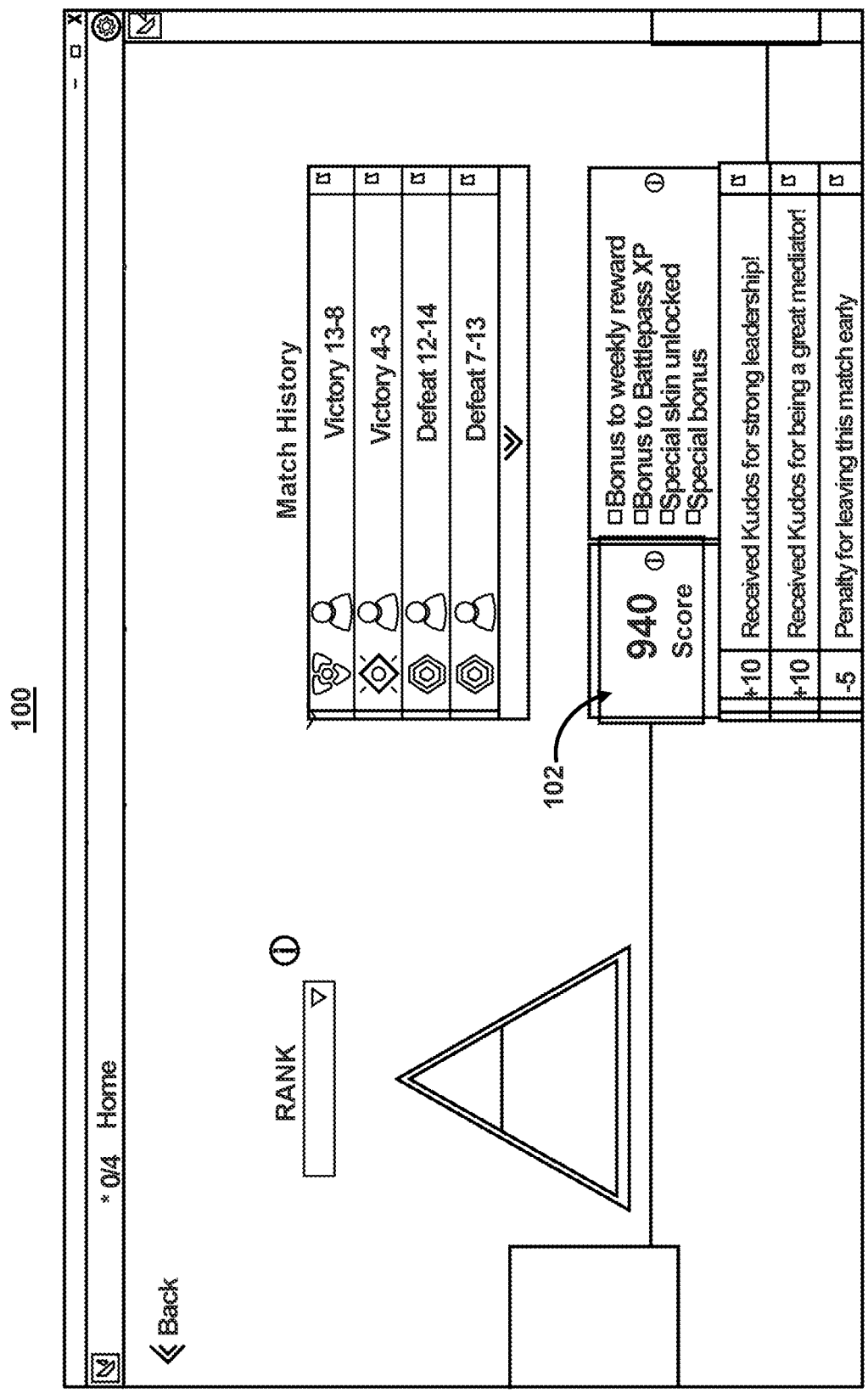
FIG. 1 shows an illustrative user interface presenting data based on a cross-platform profile, in accordance with one or more embodiments.

FIG. 1 shows an illustrative user interface presenting data based on a cross-platform profile, in accordance with one or more embodiments. As referred to herein, a user interface may comprise a human-computer interaction and communication in a device, and may include display screens, keyboards, a mouse, and the appearance of a desktop. For example, a user interface may comprise a way a user interacts with an asset, an application, and/or a website. As referred to herein, an asset may include any electronic game (or game with an electronic asset component) that may be played (or otherwise consumed on) on a computing device (e.g., a personal computer, gaming console, and/or mobile phone). An asset may comprise native asset data. As referred to herein, native data refers to data that is native to an application (e.g., an asset), whereas non-native data refers to data that did not originate from the application).

In some embodiments, the system may create and/or use a cross-platform profile. As referred to herein, a cross-platform profile may comprise a single profile that is used across multiple assets, asset/content providers, and/or platforms. For example, a gaming profile may be a form of user profile (as further described below) that is required when playing an asset online and/or offline. The gaming profile may store a user's score, settings, preferences, achievements, and/or asset progress. A cross-platform profile may comprise a gaming profile that is functional, and stores information for, multiple assets, asset/content providers, and/or platforms.

For example, the cross-platform profile may provide a way to determine how "toxic" a user is across multiple assets, platforms, and in different gaming environments. For example, conventional systems that allow players to be banned for misconduct (e.g., bad remarks, poor conduct, etc.) are assessed only at an individual asset level. Furthermore, even if these systems were distributed across multiple assets (e.g., via a streaming and/or online gaming account), they would still not properly assess the "toxicity" of the player because the "toxicity" is dependent not only on the asset in which the conduct occurred, but also the current players and the current "toxicity" atmosphere of the asset or asset scenario. The cross-platform profile and the cross-platform gaming reputation system discussed herein address these problems. Notably, not only does the cross-platform profile and the cross-platform gaming reputation system address these issues, but it goes beyond conventional systems in incident detection as well. For example, conventional systems only report "known" incidents (e.g., incident recommended manually by other users or through a reporting system native to a specific game), the cross-platform profile and the cross-platform gaming reputation system goes beyond this and finds unreported incidents as well.

For example, FIG. 1 shows user interface 100. User interface 100 comprises a user interface that includes data related to a cross-platform profile. User interface 100 includes cross-platform reputation 102. Cross-platform reputation 102 may comprise a reputation score based on one or more incidents, in one or more assets, which are detected by a cross-platform gaming reputation system. For example, as described herein, the cross-platform gaming reputation system (hereafter referred to simply as the "system"), which generates, maintains, and facilitates the cross-platform profile may detect, report, and/or respond to toxic gameplay in one or more assets. This system may use machine learning models (e.g., as described below) to detect unreported incidents of user behavior. For example, conventional assets may allow one user to report the behavior of another user. However, as described above, these conventional mechanisms have several shortcomings. The system, which may supplement and/or replace conventional mechanisms may automatically detect, report, and/or response to incidents of user behavior.

As referred to herein, an incident refers to an asset event related to the user's behavior. In most circumstances, the event is an in-asset event (e.g., relates to user behavior in-asset); however, in some cases, the event may be an out-of-asset event (e.g., relates to user behavior out-of-asset). Out-of-asset behavior may comprise bullying and/or threats made outside the ecosystem of the asset (e.g., via conventional telephone calls, emails, etc.). The incident detected by the system may be a positive incident (e.g., be reflective of non-toxic gaming behavior) or may be a negative incident (e.g., be reflective of toxic gaming behavior). The system may detect either and/or respond to the incident by modifying a reputation score for a reputation score (e.g., cross-platform reputation 102) and/or taking another action.

For example, the system may update a reputation score for the cross-platform profile associated with the user. The reputation score may be used by the system for a plurality of purposes. For example, the reputation score may be used to determine whether a user may access particular features and/or should be blocked or banned from features. For example, in some embodiments, the system may perform matchmaking based on a reputation score. The system may also generate leaderboards and/or rankings based on the reputation score.

Figure 2:
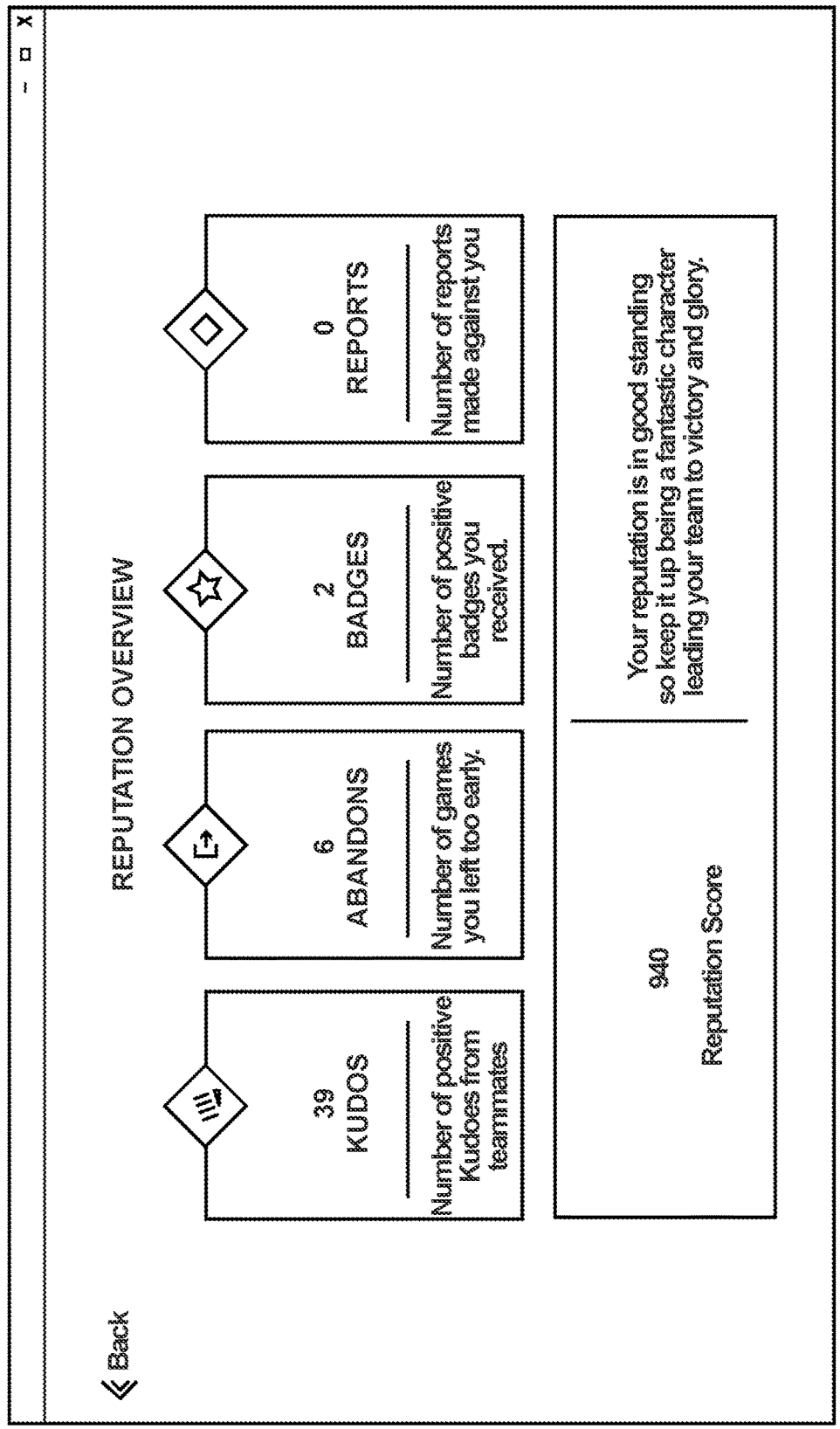
FIG. 2 shows an illustrative user interface presenting a breakdown of a scoring system based on detected incidents, in accordance with one or more embodiments.

As shown in FIG. 2, the system may provide a user with a breakdown of incidents that may affect a reputation score of the user. These may include other known incidents (e.g., an incident recommended manually by another user and/or detected using a conventional reporting mechanism) as well as incidents detected by the system. Each incident may have a different weight and/or effect on the reputation score of the user. The system may determine the weight and/or effect based on a known listing (e.g., publicly available rules or guidelines) or may dynamically determine the weight and/or effect. For example, the system may determine the weight and/or effect based on the severity of the incident, the frequency of similar incidents, whether the incident is similar to a past incident, or associated with a pattern of behavior, etc.

The system may generate an incident recommendation based on an incident and/or a reputation score (e.g., based on an update to a reputation score being detected and/or a reputation score reaching a particular threshold). For example, user interface 200 may comprise an incident recommendation. As referred to herein, an incident recommendation refers to a generation of additional data in response to a trigger (e.g., related to an incident and/or reputation score). For example, the incident recommendation may cause the system to retrieve context data (e.g., as described below) if not already retrieved and/or reconstruct asset data (e.g., as described below).

The system may perform one or more actions in response to the incident. For example, in response to a negative incident, the system may ban, block, warn, and/or take some other form of sanctions or punishment. In contrast, in response to a positive incident, the system may reward a user. The system may also automatically perform one or more actions discussed above in relation to the reputation score. For example, as shown in FIG. 3, user interface 300, which may comprise a ranking and/or leaderboard for a cross-platform profile may indicate that a user has earned a reward based on a detected incident and/or reputation score. The incidents may be detected by the system in asset data (or telemetry data derived from the asset data) as discussed below.

As referred to herein, asset data may include any data that is native to an asset and/or is presented (e.g., in a user interface) during a user's interaction with an asset. For example, asset data may include any electronically consumable median asset, such as Internet content (e.g., streaming content, downloadable content, Webcasts, etc.), video clips, audio, content information, pictures, rotating images, documents, playlists, websites, articles, electronic books, blogs, advertisements, chat sessions, social media, applications, assets, and/or any other media or multimedia and/or combination of the same that is presented by an asset and/or presented in conjunction with an asset.

Asset data may also include metadata about a current state of the asset. For example, asset data may indicate a current in-asset position of the user as well as the current in-asset position of other users (e.g., in a multiplayer asset) and objects within the asset (e.g., in-asset walls, in-asset objects, in-asset non-playable characters, etc.). Asset data may also include current rankings of users in the asset, current circumstances (e.g., a current level of the asset achieved and/or in-asset progress of the asset). Asset data may also indicate characteristics of a gaming environment of the asset (e.g., settings or characteristics of an in-asset physics engine). In some embodiments, asset data may be multimedia data and may comprise text, audio, images, video, or interactivity content forms. Asset data may be stored, recorded, played, displayed, or accessed by one or more devices, but may also be part of a live performance. Asset data, in some embodiments, may be received from another source (e.g., a social media platform) and presented through the asset interface. In some embodiments, the system may extract telemetry data from the asset data.

As referred to herein, telemetry data may comprise any asset data that is obtained remotely by the system, and which pertain to in-asset development and/or in-asset research. Telemetry data may include remotely monitored asset data obtained from an analysis of asset servers, mobile devices, user behavior, and/or asset production equipment. The system may receive the telemetry data from an installed client that transmits asset data, code embedded in the asset client that transmits data to a collection server, and/or based on streaming/downloading data from an asset server. The extraction of telemetry data and its use in reconstructing asset data is further discussed in FIGS. 6A-E below.

Telemetry data may include user telemetry data (e.g., telemetry data on the behavior, actions, and/or state of users in an in-asset environment such as interactions with the in-asset environment, purchasing behavior, in-asset movements, and/or their interaction with other users or applications). Telemetry data may include gaming environment data (e.g., quantitative measures, metrics, and tools that may be used to track events within the asset). For example, telemetry data may be used to define a state or instance of the asset environment. In some embodiments, the telemetry data may be time stamped to indicate a precise time that the telemetry data represented the current events (or state) of the asset. For example, each set of telemetry data may be individually time stamped and include metadata that may be subsequently searched and/or the basis for archiving (e.g., an asset identifier, user server identifier, user identifier(s), and/or other in-asset characteristics). For example, in some embodiments, telemetry data, which may comprise data indicating in-game interactions of one or more users (e.g., data indicating movements, actions, and/or other in-asset interactions with the in-asset environment). Telemetry data may be distinguished from communication data, which may comprise communications between one or more users (e.g., via audio, text, and/or video communications).

In some embodiments, telemetry data may be processes to detect events, and in particular in-asset incidents and/or correlate out-of-asset incidents with in-asset events. For example, the system may use the time-stamped telemetry data to create a log of all (or a subset of) in-asset events. The time-stamps may use various increments (e.g., 100 milliseconds to 500 milliseconds) and/or may be correlated to a particular frame and/or screenshot of asset data.

Telemetry data may be resampled asset data that may comprise a down-sampled, compressed, and/or size-reduced version of the asset data. For example, telemetry data may comprise a downsampled version of the original asset data. Alternatively or additionally, the telemetry data may comprise a compressed version of the original asset data. Alternatively or additionally, the telemetry data may comprise a significantly smaller amount of data that represents the events in the asset data. For example, the telemetry data may preserve certain aspects of the asset data for use in detecting in-asset incidents. These aspects may include in-asset positions of users, objects, objectives, items, and/or the physics engine characteristics that indicate how these aspects move and interact with each other.

To reduce the amount of data stored and/or processed, the telemetry data may not include graphical data such as texture maps, sprites, skins, and/or color values of individual pixels. Similarly, values related to 2D and/or 3D rendering (e.g., elements related to geometry, volume, modeling, viewpoint, texture, lighting, and shading) may not be extracted from asset data. For example, while some telemetry data may represent lower resolution graphical asset data, in some embodiments, telemetry data does not include any graphical data. Instead, the telemetry data includes data on the positions, movements, trajectories, and momentum of objects with the asset. For example, telemetry data may be asset data that is stripped of any data that is not needed by a machine learning model for detecting, reporting, and/or responding toxic behavior. For example, as further described below, the system may process telemetry data using one or more machine learning models to detect, report, and/or respond to incidents. The machine learning models may not require graphical data for detecting, reporting, and/or responding toxic behavior. Therefore, the system may not extract this data. This is beneficial to the system as less data need to be stored and/or processed. In some embodiments, telemetry data may be used to generate reconstructed asset data.

As referred to herein, reconstructed asset data may include asset data that is presented with non-native graphical elements for human consumption. For example, reconstructed asset data may comprise a reconstruction presentation of native gameplay using extracted telemetry data and non-native graphical elements. For example, while the system may process telemetry data using one or more machine learning models to detect, report, and/or respond to incidents, the system may in some instances need to recreate an asset environment in a human-consumable format.

For example, in some embodiments, an incident detected by one or more machine learning models may require a human reviewer to review the alleged incident. In such cases, the system may need to reconstruct original asset data as the telemetry data is not human-consumable (i.e., there are no, or a limited amount of, graphical elements). The system may therefore supplement the telemetry data with non-native graphical elements in order to provide a human reviewer with content to review.

In some embodiments, the system may also retrieve context data to describe the context of the reconstructed asset data. Context data may include both native asset data (or data derived from native asset data) or non-native asset data. For example, the context data may include social network data, asset-specific data, analytics data, user-specific data, and/or industry data. In some embodiments, context data may be retrieved upon the detection of an incident, during the processing of telemetry data for detect incidents, upon the reconstruction of asset data for manual review, and/or prior to, or as part of, generating an incident recommendation (e.g., for an appeal, for manual review, etc.).

As referred to herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. In some embodiments, an asset (e.g., via audio, video, and/or text chat features) may comprise a social network. Alternatively or additionally, an asset may access information from a social network and display this information natively in the asset data. For example, the asset may access a social media server and information on the social media server and present that information as native asset data. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user. Asset environments may exhibit this same functionality with a user having a contact or friends list that gives some entities preferred access.

In some embodiments, the system may use social network data to determine a context of an incident. For example, the system may identify that objectionable language and/or actions were detected. However, the system may weigh the severity of the language and/or actions based on the language and/or actions occurring with users listed as contacts in the social network data. For example, the system may not detect an incident if the objectional language is used when interacting with a social network contact, whereas an incident may be detected if the objectional language is used with interacting with a user that is not a social network contact. In some embodiments, social network data for a user may be included in user-specific data.

As referred to herein, user-specific data may include any collection of data that is specific to a user (e.g., preferences, accounts settings social network data, rankings, etc.). In some embodiments, user-specific data may include data from a user account and/or user profile. A user account may be an identity (e.g., identifiable by a serial number and/or other alphanumeric code) created for a user in an asset and/or computer environment. A user profile may be a directory of stored user settings, preferences, and information for the related user account. For example, a user profile may have the settings for the user's installed programs and operating system. In some embodiments, the user profile may include personal data associated with a specific user, or a customized desktop environment. In some embodiments, the user profile may be digital representation of a person's identity. The data in the user profile may be generated based on the system actively or passively monitoring.

In some embodiments, user-specific data may include Personally Identifiable Information ("PII"), which may be any data that could potentially identify a specific individual. In some embodiments, any information that can be used to distinguish one person from another and can be used for deanonymizing previously anonymous data can be considered PII. For example, in some embodiments, the system may mask, remove, and/or otherwise block the display of PII in reconstructed asset data. For example, during reconstruction of the asset data, the system may compare reconstructed data that is to be presented against a database of PII. If PII is detected, the system may mask, remove, and/or otherwise block the display.

As referred to herein, asset-specific data may include data that is specific to, or specifically describes, an asset. For example, asset-specific data may include data about a classification assigned to an asset based primarily on its gameplay (e.g., genre), visual or narrative features (e.g., adult content and/or depiction of adult or mature scenarios), platforms (e.g., the computer hardware that the asset is played on and/or a specific branding), available modes of play (e.g., whether an asset is single player or multiplayer, including massively multiplayer online ("MMO") assets, cooperative assets, player versus environment ("PvE") or player versus player ("PvP") assets, release format/version (e.g., beta version, free-to-play, etc.), and/or other characteristics such as age-rating, publisher, asset type, asset settings.

As referred to herein, analytics data may include information and statistics about the consumption of assets. User demographics (e.g., age and gender distribution), along with figures on gaming penetration among populations, time spent playing assets, platforms, and devices used to play assets, rankings of best-selling assets. Rankings, leader boards, and/or averages related to a gaming population at large. In some embodiments, user behavior data may also include platform statistics on preferred asset genres, places where people play assets, and/or consumer spending on assets—both in-app and other digital purchases. In some embodiments, user behavior data may also include statistics on the use of online and assets in different circumstances (e.g., educational, recreational, and/or professional).

As referred to herein, industry data may include data related to the asset industry that include revenues of the asset makers, employment, and unit sales and market shares for various companies related to assets. In some embodiments, industry data may also include statistics on software and hardware, console and accessory sales, gaming platforms (e.g., PC, a type of gaming console, smartphone, etc.), and numbers of active and registered players for online, streaming, and social assets from companies.

Figure 4:
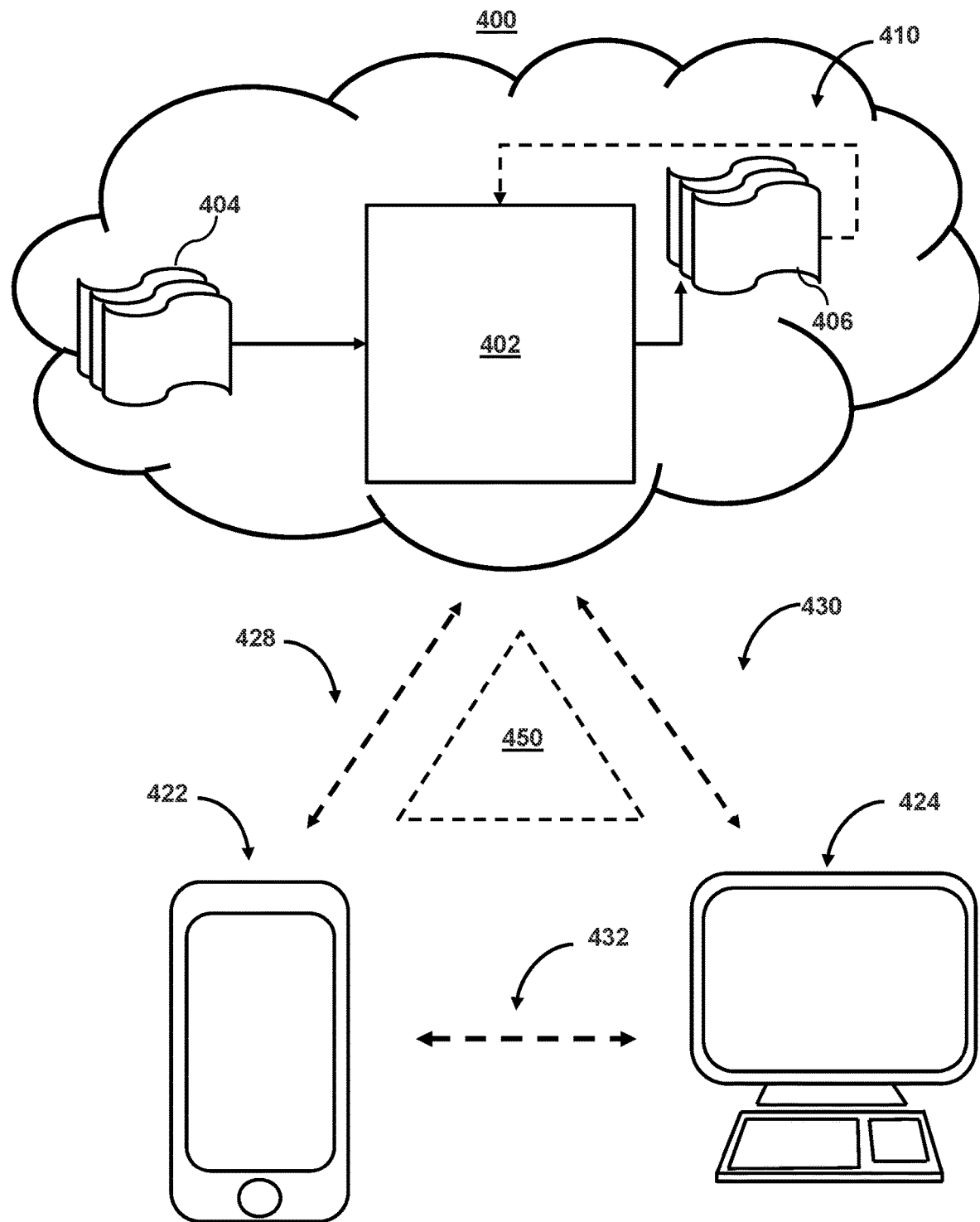
FIG. 4 shows an illustrative system diagram for detecting, reporting, and/or responding to toxic behavior, in accordance with one or more embodiments.

FIG. 4 shows an illustrative system diagram for detecting, reporting, and/or responding to toxic behavior, in accordance with one or more embodiments. For example, system 400 may represent the components used for detecting, reporting, and/or responding to toxic behavior, as shown in FIGS. 1-3. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users, may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., as shown in FIGS. 1-3).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. Cloud components 410 may also include control circuitry configured to perform the various operations for detecting, reporting, and/or responding to toxic behavior. For example, the cloud components 410 may include cloud-based storage circuitry configured to store a cross-platform profile. Cloud components 410 may also include cloud-based control circuitry configured to runs processes for detecting, reporting, and/or responding to toxic behavior. Cloud components 410 may also include cloud-based input/output circuitry configured for display data as shown in FIGS. 1-3.

Cloud components 410 may include model 402, which may be a machine learning model. Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known incident for the first labeled feature input (e.g., based on telemetry data). The system may then train the first machine learning model to classify the first labeled feature input with the known alternative content.

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402 and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train a machine learning model (e.g., an artificial neural network) to detect incidents of toxic user behavior based on telemetry data. For example, the system may receive telemetry training data (e.g., telemetry data as used to generate the reconstructed asset data shown in FIGS. 6A-E below). The system may then generate a series of features inputs based on the training data. For example, the system may generate a first feature input based on training data comprising telemetry data and/or contextual data of a first known incident (e.g., an incident of a user performing competitive cheating such as using a wall hack). The system may label the first feature input with the first known incident (e.g., labeling the data as corresponding to a classification of "competitive cheating" or a sub-group thereof such as "wall hacking"). The system may also generate a second feature input based on training data comprising telemetry data and/or contextual data of a second known incident (e.g., labeling the data as corresponding to a classification of "griefing," which corresponds to harassing other user using asset mechanics in unintended ways such as constantly walking in-front of another user's avatar in-asset). The system may label the second feature input with the first known incident (e.g., labeling the data as corresponding to a classification of "griefing" or a sub-group thereof such as "blocking"). For example, the system may train a machine learning model to recognize various classifications that correspond to category and/or sub-category of user behavior.

The system may use multiple categories, sub-categories, and/or other types of groupings. In some embodiments, the system may divide potential classifications based on the type of telemetry data used to identify the behavior. Alternatively or additionally, the system may divide the potential classifications based on the user(s) towards which the incident was directed. For example, by categorizing classifications in this manner, the system may more accurately distinguish between different actions in the telemetry data (e.g., the distinctions between feature inputs may be more refined).

For example, in some embodiments, the system may categorize incidents based on user gameplay in one category with sub-categories referring to specific gameplay actions/inactions. For example, categories may include competitive cheating (e.g., using wallhacks, aimbots, map hacks, etc.), griefing (e.g., harassing other players using asset mechanics in unintended ways such as constantly walking in-front of another user, taking other users in-asset items, etc.), intentionally feeding/throwing (e.g., intentionally losing to assist the enemy), disconnecting/rage quitting (e.g., quitting before the match is over), abundant AFKing (e.g., being away from keyboard, which may be normalized by standard match length), smurfing (e.g., a high skilled user plays as low level user), unapproved asset mods, overexploitation of bugs, ghosting (e.g., when a user has a friend on the other team feeding him/her information), boosting/ladder cheating (e.g., getting a better user to play on another user's account to boost the other user's level), illegal teaming playing as a team when a user should be playing as individuals such as in a battle royale type asset), not playing to asset goals (e.g. abandoning your team and/or asset goals), account sharing (e.g., sharing an account between multiple people (not boosting)), invalid reports of gameplay toxicity.

Additionally or alternatively, the system may categorize social behavior based on a recipient of the incident. For example, the system may categorize social—self-inflicted incidents such as suicide (e.g., an out-of-asset suicide risk and/or credible real-life suicide threat, swearing at self (e.g., using offensive language against themselves)) or self-injury. The system may categorize social—individually directed real life threats such as credible, timely real life threat with details, grooming/abuse (e.g., of minors), doxing (e.g., publishing personal information about the player—name, address, etc.), personal harassment/bullying (e.g., offensive language, racial slurs, etc. that is individually directed impersonating another player), playing and pretending to be someone else, unwanted contact (e.g., trying to engage another behavior in unwanted conversations—e.g. personal questions, etc.), stalking (e.g., consistently following a player across matches), fraud/scam (e.g., intending to deceive others into a certain behavior, selling an unauthorized good or service The system may categorize social—group direction incidents such as race, gender, sexual orientation, asset threat to a group, group identity based harassment, and/or bigoted behavior. The system may categorize social—undirected incidents such as non-player directed offensive language (e.g., cursing at the asset), spamming (e.g., dominating chat with non-relevant content), and/or negative attitude.

In another example, incidents based on inappropriate language and/or communications, which may be detected by a machine learning model based on natural language processing (e.g., for determining the context of a chat or audio communication) or may on optical character recognition of on-screen words, phrases, and/or symbols, may be categorized together, and have sub-categories that further distinguish the incidents. For example, types of inappropriate language may include group specific slurs (e.g., based on race, gender, sexual orientation, religion, geography, culture, skill level, age, and/or friends), cursing, sexually explicit language, offsite links, fraud/scams, selling items, harsh criticism, and/or trolling.

The system may then train a machine learning model to detect the first known incident based on the labeled first feature input. The system may also train a machine learning model (e.g., the same or different machine learning model) to detect the second known incident based on the labeled second feature input. For example, the training process may involve initializing some random values for each of the training matrixes (e.g., of a machine learning model) and attempting to predict the output of the input feature using the initial random values. Initially, the error of the model will be large, but comparing the model's prediction with the correct output (e.g., the know classification), the model is able to adjust the weights and biases values until having the model provides the required predictions.

The system may then receive telemetry data and/or contextual data of user behavior. For example, the system may extract asset data from an API layer operating on a user device or at a service provider (e.g., via a cloud service accessed by a user). Additionally or alternatively, the system may receive user asset files (e.g., as a download and/or streaming in real-time or near real-time). The system may then generate a third feature input based on the telemetry data and/or contextual data of the user behavior. The system may then input the third feature input into the trained machine learning model. The system may then receive an output from the trained machine learning model indicating whether the telemetry data and/or contextual data of the user behavior corresponds to the first known incident or the second known incident (or another classification and/or sub-classification).

System 400 also includes API layer 450. For example, in some embodiments, the system may be implemented as one or more APIs and/or an API layer. In some embodiments, API layer 450 may be implemented on user device 422 or user terminal 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use developer portal. API layer 450 may use strong security constraints applying WAF and DDoS protection, and API layer 450 may use RESTful APIs as standard for external integration.

Figure 5:
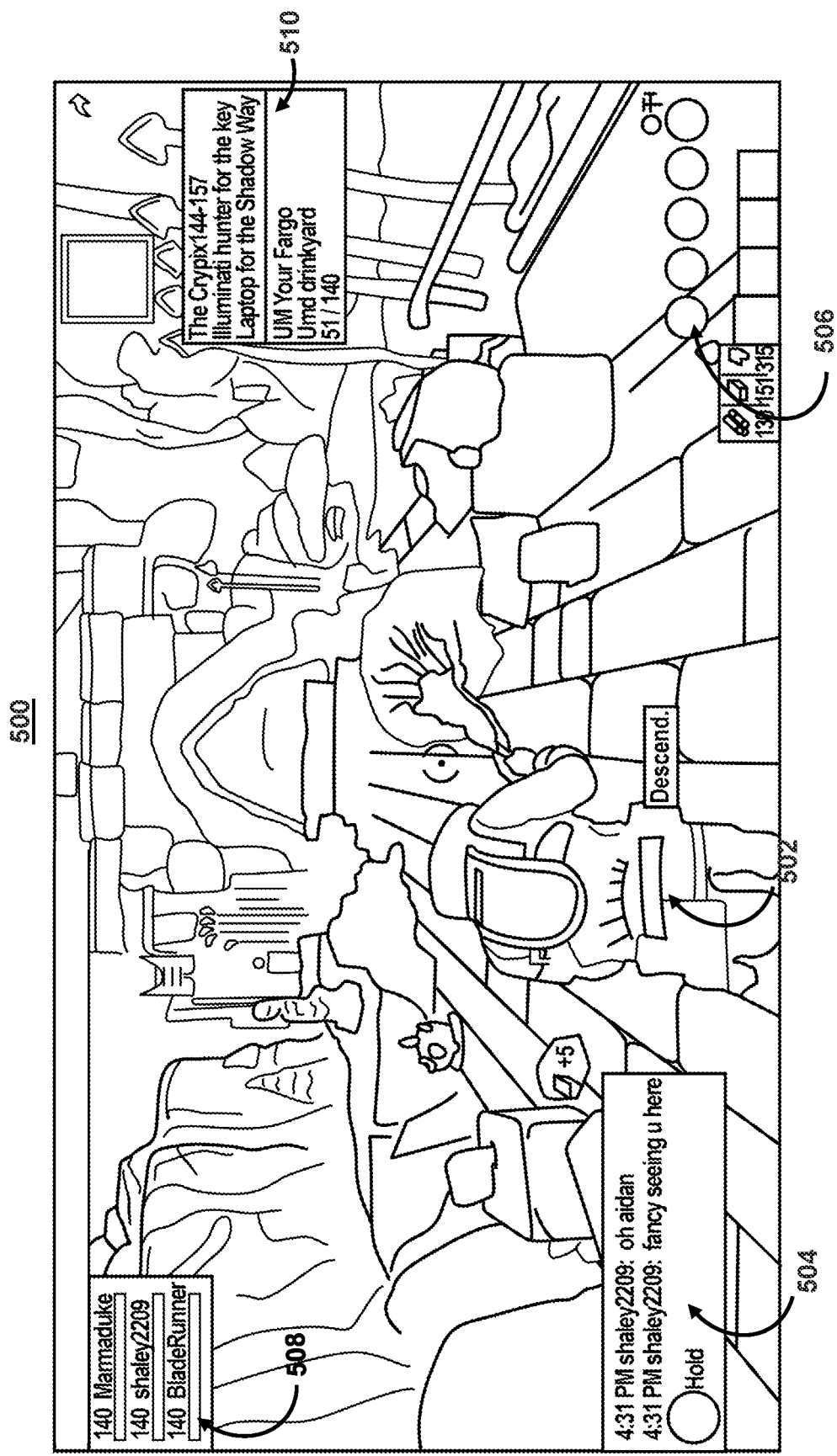
FIG. 5 is an illustrative user interface presenting native asset data, in accordance with one or more embodiments.

FIG. 5 is an illustrative user interface presenting native asset data, in accordance with one or more embodiments. For example, in some embodiments, user interface 500 may present a screenshot of an instance in an asset. The content shown in user interface 500 is derived from the asset and is therefore native asset data. Within user interface 500 many aspects of the asset are represented by the asset data. For example, user interface 500 include avatar 502 of a user playing the asset.

For example, avatar 500 is the user's representation in the asset environment. Through the use of avatar 500 the user may move through and/or interact with the asset environment. User interface 500 also include objects 506. For example, objects 506 may comprises in-asset objects that the user has collected and/or are available for use by the user with moving through and/or interacting with the asset environment. In some embodiments, objects 506 may also indicator a score, ranking, and/or other information related to the playthrough of the asset environment.

User interface 500 may also include social network data 504. For example, social network data 504 may comprise chat and/or in-asset messages that are received from other users. In some embodiments, social network data 504 may also comprise audio content (e.g., spoken by other users). While not displayed in user interface 500, audio data may be stored with the asset data shown in user interface 500 (e.g., as part of the state and/or instance of the asset as represented by user interface 500).

User interface 500 may also be time-stamped and/or include other identifiers for indexing and archiving the asset data. In some embodiments, asset data may be further aggregated based on time-stamps and/or other characteristics. For example, the system may store, index, and/or archive (e.g., during subsequent processing to detect, report, and/or respond to user behavior) with other instances (e.g., represented by other time-stamps). For example, the system may store single asset sessions, missions, runs, and/or other divisions of the asset playthrough in order to better contextualize events in the asset.

User interface 500 may also include asset-specific data. For example, user interface 500 includes asset data related to other users (e.g., user data 508) currently in the asset. For example, user data 508 may list the screennames and/or other information about other users currently in the asset environment. In some embodiments, user data 508 may comprise social network data (e.g., user data 508 may list other users that are part of an in-asset or out-of-asset social network of the user). For example, user data 508 may indicate other assets (or avatars of the other users) that the user may interact with while in the asset environment.

User interface 500 may also include asset-specific data related to a current goal and/or objective of the video (e.g., goal data 510). For example, some assets, or portions of an asset, are goal-oriented, rule-based activities, where users find enjoyment in working towards the asset goal. The asset goals may provide a sense of direction and set up the challenges that the users face. These goals may be represented visually in asset data. Alternatively or additionally, these goals may be stored with the asset data shown in user interface 500 (e.g., as part of the state and/or instance of the asset as represented by user interface 500). Goal data 510 may also be identifiable and/or included with a time-stamp and/or include other identifiers for indexing and archiving the asset data. For example, based on the time-stamp, index, etc., the system may determine what goals were available and/or active during asset sessions, missions, runs, and/or other divisions of the asset playthrough in order to better contextualize events in the asset.

Notably, many other types of asset data are shown in user interface 500. For example, asset data may also include raster graphics or bitmap images, which are a dot matrix data structure that represents a generally rectangular grid of pixels (points of color), viewable via a bitmapped display (user interface). Raster images are stored in image files with varying dissemination, production, generation, and acquisition formats. Additionally or alternatively, asset data may include vector graphics elements, which are computer graphics images that are defined in terms of points on a Cartesian plane, which are connected by lines and curves to form polygons and other shapes.

Additionally or alternatively, other types of asset data may include menus, heads-up display icons, code/routines, and/or other elements to assist a user with interaction in the asset environment. For example, asset data may also include the code, functions, and/or features that facilitate a user in accessing these menus, running the asset, and/or performing actions within the asset environment. For example, asset data may include main asset program, rendering engine, audio engine, and/or physics engine. The main asset program may be the actual asset logic that is implemented by algorithms to run an asset. The rendering engine may generate animated 2D or 3D graphics (e.g., using rasterization, ray-tracing etc.). The audio engine may comprise algorithms related to the loading, modifying, and/or output of sound through a device's speaker system. The physics engine may be responsible for simulating the laws of physics realistically within the asset. Specifically, the physics engine may provide a set of functions for simulating physical forces and collisions, acting on the various objects within the asset at run time.

It should be noted that one or more of these other types of asset data may not be extracted by the system when detecting, reporting, and/or responding to toxic gameplay in asset environments. For example, in order to reduce the amount of data that may require storing and/or processing, the system may not extract one or more of these other types of asset data when generating/receiving telemetry data. For example, graphical asset data and/or the engines that facilitate the graphical asset data as well as the main asset program, etc. may not be required by the system to detect, report, and/or respond to toxic gameplay in asset environments. For example, as opposed to extracting all native asset data, the system may extract only the asset data required for detecting, reporting, and/or responding to toxic gameplay in asset environments such as telemetry data and contextual data as further described in FIGS. 6A-E.

FIG. 6A-E is an illustrative example of reconstructed asset data based on telemetry data, in accordance with one or more embodiments. For example, as described herein, the system may detect incidents using one or more machine learning models (as described in FIG. 4 above). The system may perform these detections based on the lower amount of data (e.g., as compared to native asset data) that comprises telemetry and/or contextual data. Much of the native asset data that is not extracted (e.g., that does not comprise the telemetry data) may be graphical and programming logic of the native asset data. For example, while such information may be necessary for a human to consume the asset data and/or comprehend the actions in the asset data, the machine learning models may be trained instead on feature inputs that do require this information. However, in some instances, the system may need to reconstruct some of the native asset data (e.g., native graphic elements) in order for a human user to interpret the detected incident.

For example, in some embodiments, the system may generate reconstructed asset data for use in a manual review process of a detected incident. In such cases, the system may reconstruct a portion of an asset session, a clip featuring the incident, and/or one or more pieces of contextual content (e.g., other player positions, asset environment features, current objects (e.g., object 506 (FIG. 5)), social network data (e.g., social network data 504 (FIG. 5)), user data (e.g., user data 508 (FIG. 5)), and/or current objectives/goals (e.g., goal data 510 (FIG. 5))). During the reconstruction, the reconstructed asset data may also include non-native asset data (e.g., asset data generated from other sources as well as further modification (e.g., the masking of PII)).

Figure 6A:
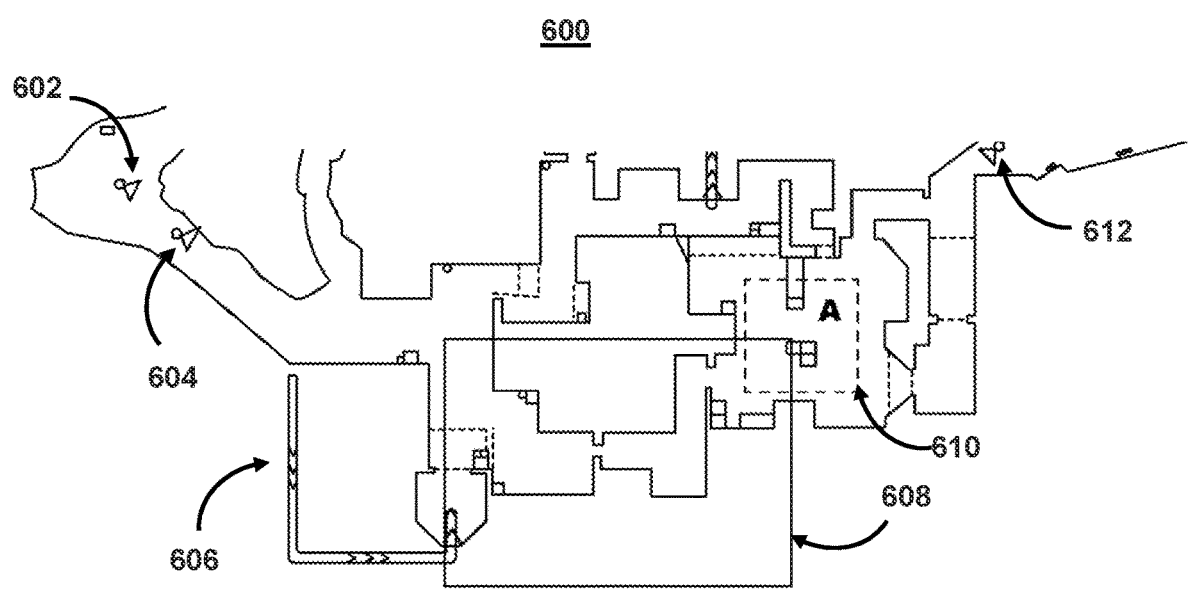
FIG. 6A-E is an illustrative example of reconstructed asset data based on telemetry data, in accordance with one or more embodiments.

FIG. 6A shows reconstructed asset environment 600. For example, as shown to a user in a user interface (e.g., user interface 100 (FIG. 1)) during a manual review of an incident recommendation, an appeal of an incident, and/or a random sampling of incidents detected (e.g., for calibration, validation, and/or training purposes). For example, reconstructed asset environment 600 may correspond to a native asset environment (e.g., as described in FIG. 5).

For example, reconstructed asset environment 600 shows the movement and positions of user 602 and user 604. User 604 may correspond to the movements and positions of avatar 502 (FIG. 5). For example, while reconstructed asset environment 600 may be of different and/or a lower quality graphical representation, user 604 still describes the movements and positions of avatar 502 (FIG. 5) during the asset session of FIG. 5. Additionally and/or alternatively, reconstructed asset environment 600 may include different viewpoints and/or user tracking components. For example, reconstructed asset environment 600 is of an overhead view (as opposed to a third person-view as in FIG. 5) and may allow a user to freely scroll about, adjust playback position and speed, and/or otherwise adjust reconstructed asset environment 600 to review and/or monitor an incident. In some embodiments, the system may selectively recreate these elements based on whether or not the elements factored into the incident (e.g., whether or not the movements, actions, and/or presence of these elements caused (entirely or partly) the triggering of the incident).

Reconstructed asset environment 600 also includes boundary 606, which may correspond to an in-asset boundary, obstacle, or passageway. For example, reconstructed asset environment 600 may be represented by a plurality of boundaries, which create a representation of the playable asset environment. In some embodiments, boundary 606 may also include other representations (e.g., current settings of a physics engine, directions of available movement, breakable objects in-asset, etc.). Additionally or alternatively, boundary 606 may include different characteristics to represent the different characteristics of a boundary. For example, boundary 606 includes arrows designating the only direction through which user 604 may pass (e.g., a one-way passageway). In another example, a boundary may represent whether or not the mechanics of the asset allow passage. For example, a boundary may be indicated by the system as an impassable wall. If user 604 is then detected passing through the wall (e.g., triggering a wall hack incident), the system may represent this incident as user 604 transitioning through the boundary. In some embodiments, the system may selectively recreate these elements based on whether or not the elements factored into the incident (e.g., whether or not the movements, actions, and/or presence of these elements caused (entirely or partly) the triggering of the incident).

Reconstructed asset environment 600 also includes highlight 608. For example, highlight 608 may indicate a position within reconstructed asset environment 600 that the system has detected an incident. For example, the system may recreate a portion (or an entirety of reconstructed asset environment 600) in order to represent the circumstances of the detected incident. However, in order to aid the review of a user, the system may generate highlight 608, which is a graphical element that aids a user, and/or draws the attention of a user, to an area in reconstructed asset environment 600 where the incident was detected. In some embodiments, the system may selectively recreate these elements based on whether or not the elements factored into the incident (e.g., whether or not the movements, actions, and/or presence of these elements caused (entirely or partly) the triggering of the incident).

Reconstructed asset environment 600 may also include goal 610. For example, reconstructed asset environment 600 may indicate a goal of a current asset scenario. The system may have used this goal to determine whether or not an incident occurred. For example, the system may use goal 610 (or goal data used to generate goal 610) to determine whether or not the actions or inactions of a user where in furtherance of the goal of the asset. In some embodiments, the system may selectively recreate these elements based on whether or not the elements factored into the incident (e.g., whether or not the movements, actions, and/or presence of these elements caused (entirely or partly) the triggering of the incident.)

Reconstructed asset environment 600 also include non-playable character ("NPC") 612, interaction with which may help users achieve a goal (e.g., NPC 612 may be a helpful character) or prevent users from achieving a goal (e.g., NPC 612 is an enemy). In some embodiments, the system may selectively recreate these elements based on whether or not the elements factored into the incident (e.g., whether or not the movements, actions, and/or presence of these elements caused (entirely or partly) the triggering of the incident).

Figure 6B:
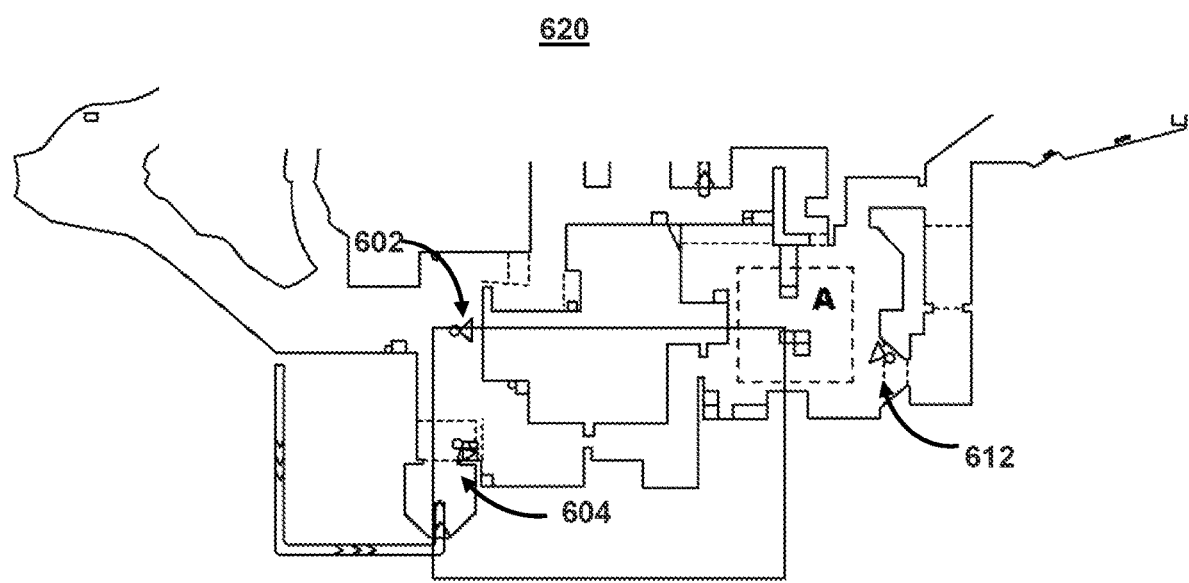

FIG. 6B shows reconstructed asset environment 620. For example, as shown to a user in a user interface (e.g., user interface 100 (FIG. 1)) during a manual review of an incident recommendation, an appeal of an incident, and/or a random sampling of incidents detected (e.g., for calibration, validation, and/or training purposes). For example, reconstructed asset environment 620 may correspond to a native asset environment (e.g., as described in FIG. 5).

For example, reconstructed asset environment 620 now shows user 602 and user 604 as user 602 and 604 have moved through asset environment 620 towards the goal. Asset environment 620 also shows NPC 612 has also moved towards the goal. In some embodiments, the system may also show movements and updates to other elements of asset environment 620 as necessary. However in some embodiments, the system may limit this to lower the amount of data processed and/or to prevent PII or other data about users to be unnecessarily presented.

Figure 6C:
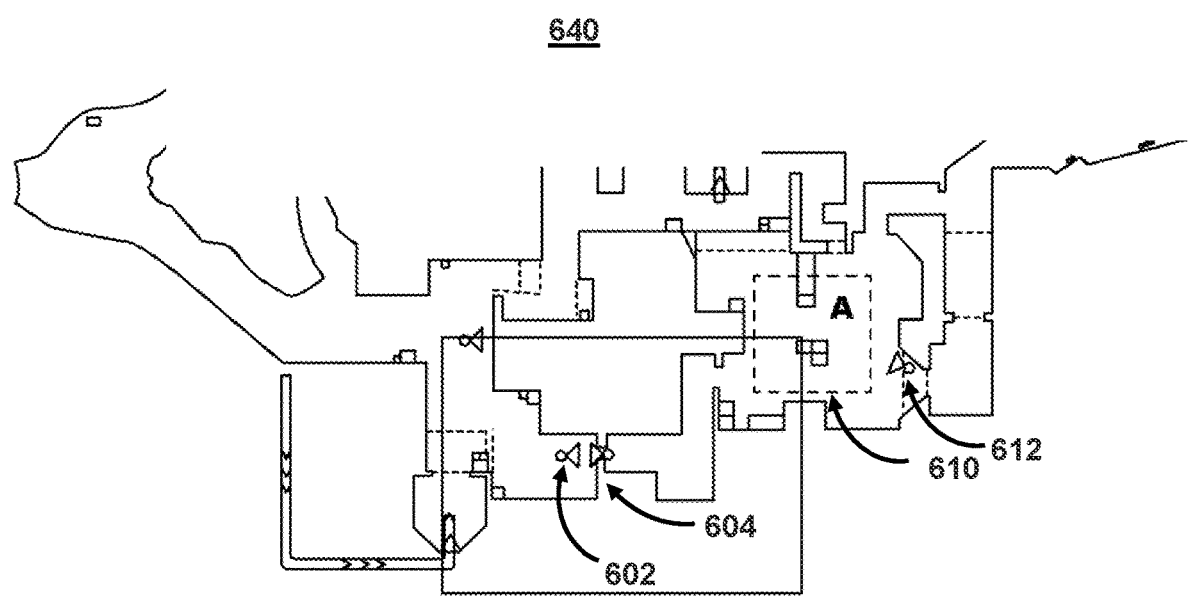

FIG. 6C shows reconstructed asset environment 640. For example, as shown to a user in a user interface (e.g., user interface 100 (FIG. 1)) during a manual review of an incident recommendation, an appeal of an incident, and/or a random sampling of incidents detected (e.g., for calibration, validation, and/or training purposes). For example, reconstructed asset environment 640 may correspond to a native asset environment (e.g., as described in FIG. 5).

For example, reconstructed asset environment 640 now shows user 602 and user 604 as user 602 and user 604 have further moved through asset environment 640 towards goal 610. Asset environment 640 also shows NPC 612, which has not moved closer towards goal 610. Additionally, the movement of user 604 has stopped and the position (e.g., blocking the only passageway towards goal 610) and/or orientation (e.g., facing away from goal 610) of user 604 indicates that user 604 is no longer proceeding towards goal 610. Furthermore, the position of NPC 612, which is not between goal 610 and user 604 indicates that NPC 612 is not the cause of the position, orientation, and/or lack of movement of user 604. Additionally, audio and/or textual chat may indicate that user 604 and user 602 are not communicating (or are communicating about abusive behavior of user 604). For example, any of these activities may have been the basis for the system triggering the incident and/or generating an incident recommendation (e.g., featuring the reconstructed asset environments of FIGS. 6A-E). For example, one or more of these activities may be represented via a feature input and fed into a machine learning model (e.g., as described in FIG. 4). The machine learning model may classify the behavior of user 604 as toxic (e.g., corresponding to a "blocking").

Figure 6D:
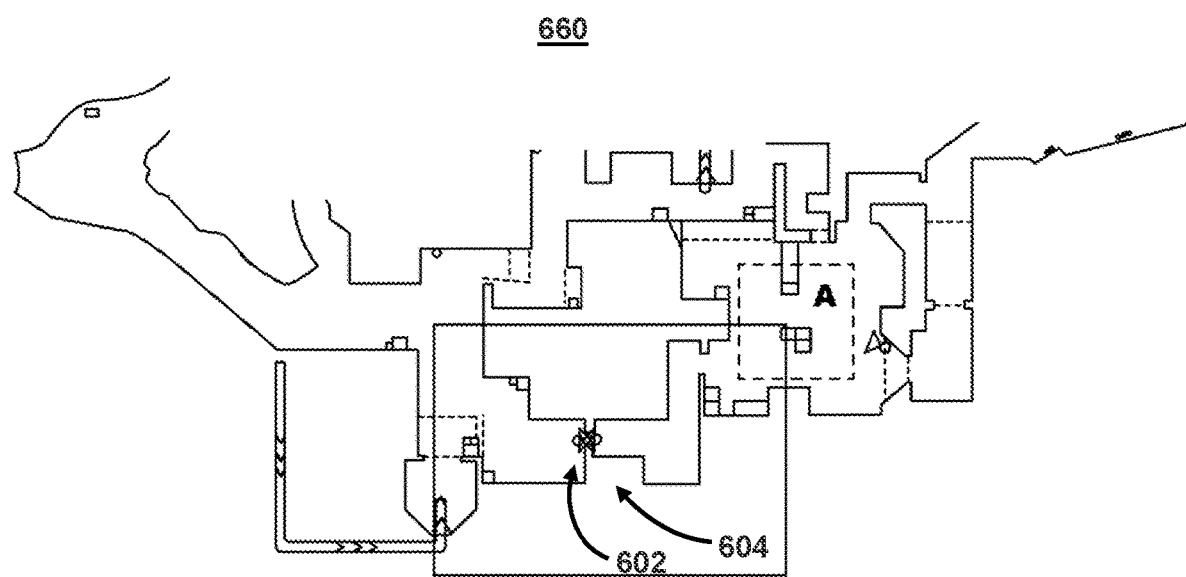

FIG. 6D shows reconstructed asset environment 660. For example, as shown to a user in a user interface (e.g., user interface 100 (FIG. 1)) during a manual review of an incident recommendation, an appeal of an incident, and/or a random sampling of incidents detected (e.g., for calibration, validation, and/or training purposes). For example, reconstructed asset environment 660 may correspond to a native asset environment (e.g., as described in FIG. 5).

For example, reconstructed asset environment 660 may continue to show user 602 and user 604 interacting. For example, the movement of user 604 has remained stopped, and the position (e.g., blocking the only passageway towards goal 610) and/or orientation (e.g., facing away from goal 610 and towards user 602) of user 604 indicates that user 604 is no longer proceeding towards goal 610 and/or is in a confrontation with user 602. Furthermore, the position of NPC 612, which is not between goal 610 and user 604 indicates that NPC 612 is still not the cause of the position, orientation, and/or lack of movement of user 604. Additionally, audio and/or textual chat may further indicate that user 604 and user 602 are not communicating (or are communicating about abusive behavior of user 604, and not about proceeding towards the goal). For example, any of these activities (or the continuation of these activities) may have been the basis for the system triggering the incident and/or generating an incident recommendation (e.g., featuring the reconstructed asset environments of FIGS. 6A-E. For example, one or more of these activities may be represented via a feature input and fed into a machine learning model (e.g., as described in FIG. 4). The machine learning model may classify the behavior of user 604 as toxic (e.g., corresponding to "blocking"), and thus continue to present reconstructed asset environment 660.

Figure 6E:
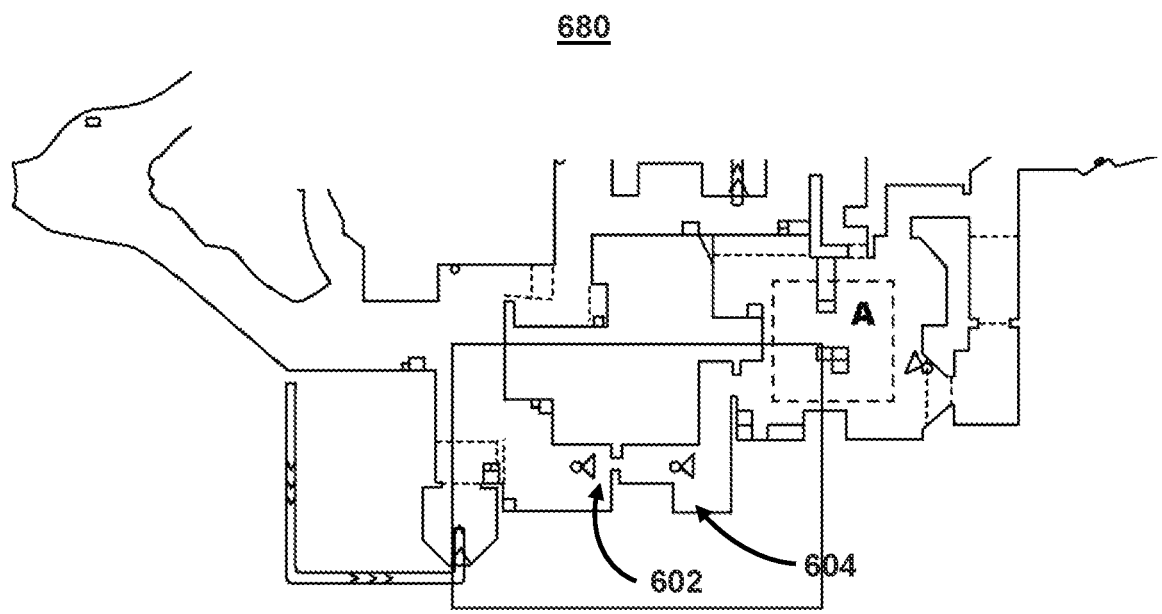

FIG. 6E shows reconstructed asset environment 680. For example, as shown to a user in a user interface (e.g., user interface 100 (FIG. 1)) during a manual review of an incident recommendation, an appeal of an incident, and/or a random sampling of incidents detected (e.g., for calibration, validation, and/or training purposes). For example, reconstructed asset environment 680 may correspond to a native asset environment (e.g., as described in FIG. 5). For example, reconstructed asset environment 680 now shows that user 604 has changed his orientation and begun proceeding towards the goal. The system may have determined that the incident that was detected has now been completed (or the portion of gameplay that constituted the incident has now been completed) and may thus end the presentation of the reconstructed asset environment.

It should be noted that the reconstructed asset environments of FIGS. 6A-E may be presented in a user interface (e.g., as shown in FIGS. 1-3) and/or on any one of the components described in FIG. 4. The system may also present any context data that may aid a user in interpreting the reconstructed asset data. In some embodiments, the system may selectively recreate the context data based on whether the context data factored into the incident (e.g., whether or not the context data caused (entirely or partly) the triggering of the incident).

Figure 7:
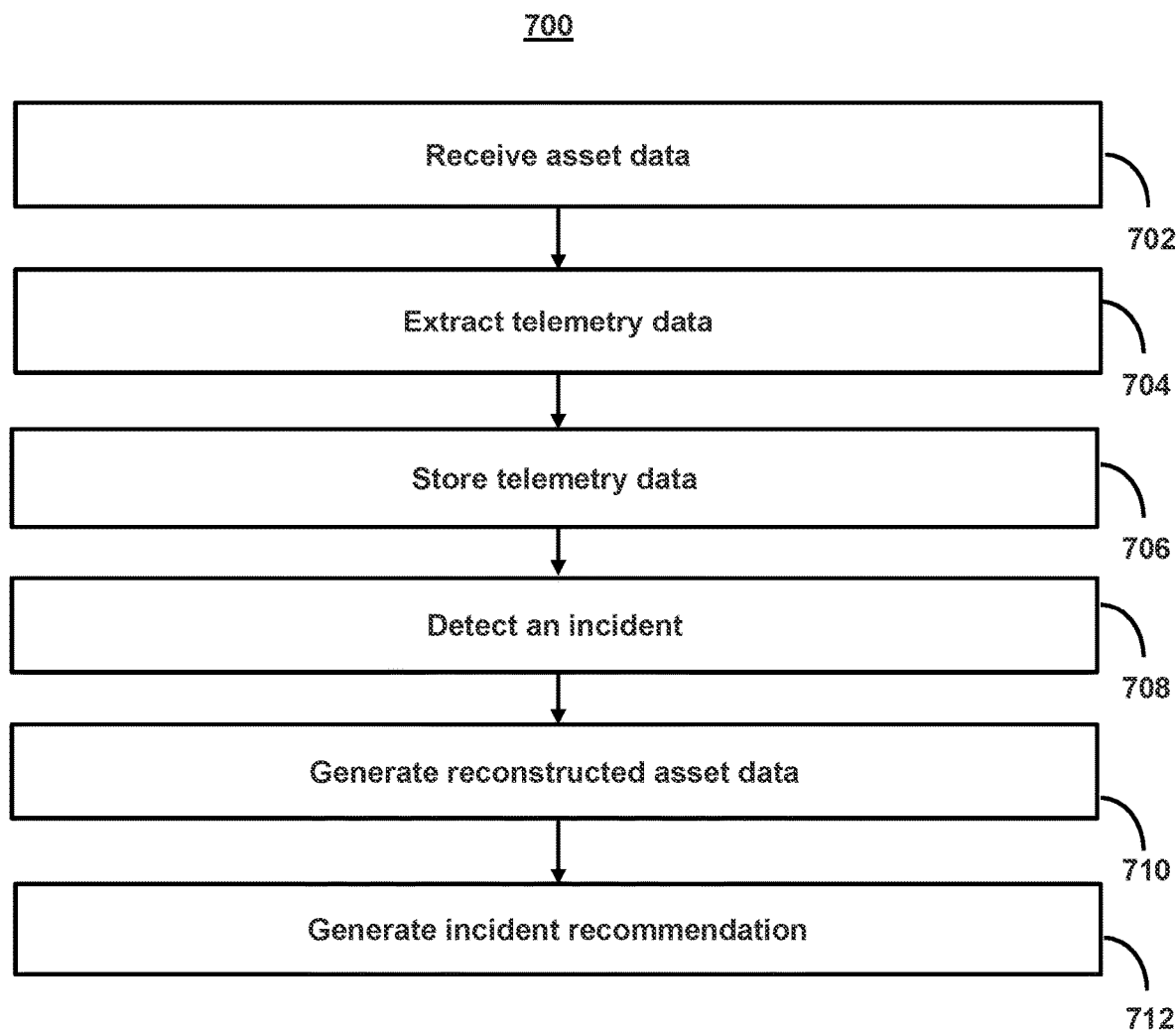
FIG. 7 shows a flowchart of the steps involved in generating incident recommendations in processed data using machine learning models, in accordance with one or more embodiments.

FIG. 7 shows a flowchart of the steps involved in generating incident recommendations in processed data using machine learning models, in accordance with one or more embodiments. For example, FIG. 7 shows process 700, which may be implemented by one or more devices (e.g., as described in FIG. 4 above). The system may implement process 700 in order to generate one or more of the user interfaces (e.g., as described in FIGS. 1-3) and/or the reconstructed asset data (e.g., as described in FIGS. 6A-E). For example, process 700 may overcome the technical hurdles with generating incident recommendations.

At step 702, process 700 (e.g., via one or more components of system 400 (FIG. 4)) receives asset data. For example, the system may receive native asset data. For example, native asset data may comprise video game data that is presented to a user during a user's interaction with the video game. Additionally or alternatively, the system may retrieve native asset data that includes social network data (e.g., a social graph indicating a relationship between two users). In some embodiments, the machine learning model may use the relationship to detect an incident (or to determine that no incident occurred). For example, a feature input that is inputted into a machine learning model may indicate social network relationships between users.

At step 704, process 700 (e.g., via one or more components of system 400 (FIG. 4)) extracts telemetry data. For example, the system may extract telemetry data from the native asset data. For example, the telemetry data may indicate a behavior, action, and/or state of one or more users in an in-asset environment corresponding to the asset data. In some embodiments, the system may extract different types, amounts, and lengths of telemetry data. For example, the system may use information included in the asset data to determine what data is needed to detect incidents.

For example, the system may retrieve asset-specific data from the asset data. The asset-specific data may include data that indicate a genre, age group, game objectives, etc. The system may use this information to determine whether or not specific telemetry data is required. For example, in a social media game, with no objectives, the system may not require information on the goal and/or objective (e.g., goal data 510 (FIG. 5)). In contrast, in a competitive action game, the system may need to extract information about a goal.

For example, in some embodiments, the system may retrieve asset-specific data from the asset data. The asset-specific data may describe specific characteristics (e.g., genre) about the asset. The system may then determine an asset type based on the asset-specific data. For example, the system may determine a category and/or characteristic that distinguishes the asset from another asset. The system may then determine a type of telemetry data to extract based on the asset type. For example, some telemetry data may relate to a goal, hitboxes of in-asset avatars, etc.

In some embodiments, the system may use asset type information for other purposes. For example, the system may determine the frequency at which to pull asset data from a data source based on the asset type. For example, the system may determine to pull (or request) data at a varying frequency, as some assets may generate more data more quickly (e.g., requiring more frequent data pulls to minimize network congestion due to large file sizes caused by any one data pull), may have different data purge schedules and/or data storage periods (e.g., requiring the system to extract data prior to a purge), may synchronize the release of asset data to production/delivery schedules (e.g., asset data is only released after a subsequent update is released), etc.

At step 706, process 700 (e.g., via one or more components of system 400 (FIG. 4)) stores telemetry data. For example, the system may store the telemetry data. In some embodiments, the system may compress and/or reduce the amount of telemetry data to store. Furthermore in some embodiments, the system may selectively down-sample telemetry data based on asset information (e.g., an asset type of the asset). For example, some assets (e.g., assets comprising a particular genre) may have telemetry data that may be further down-sampled than others. In such cases, the system may down-sample telemetry data that may be down-sampled without effecting detection of incidents in the down-sampled data.

At step 708, process 700 (e.g., via one or more components of system 400 (FIG. 4)) detects an incident. For example, the system may detect an incident based on an output from a machine learning model, wherein the machine learning model is trained to detect known incidents in training data comprising labeled telemetry data. In some embodiments, the system may randomly sample telemetry data for incidents.

At step 710, process 700 (e.g., via one or more components of system 400 (FIG. 4)) generates reconstructed asset data. For example, the system may, in response to detecting the incident, generate reconstructed asset data based on the telemetry data. The system may store telemetry data to achieve a reduction in amount of data stored. For example, the system may retrieve user-specific data for a first user, and then randomly determine an incident sampling frequency (e.g., a frequency at which the telemetry data is sampled for an incident). The system may then sample the telemetry data at the incident sampling frequency. Alternatively or additionally, the system may sample the telemetry of different users (e.g., corresponding to different cross-platform profiles) at different rates. For example, the system may use user-specific data (e.g., the number of known incidents associated with the cross-platform profile) to determine an incident sampling frequency. For example, the system may retrieve user-specific data for a first user. The system may then determine an incident sampling frequency based on known incidents in the user-specific data and sample the telemetry data at the incident sampling frequency.

At step 712, process 700 (e.g., via one or more components of system 400 (FIG. 4)) generates an incident recommendation. For example, the system may generate for presentation, in a user interface, an incident recommendation comprising the reconstructed asset data. For example, the system may generate an incident recommendation that may be accessed in a user interface (e.g., as shown in FIGS. 1-3).

In some embodiments, the system may retrieve non-native asset data. The system may then correlate a portion of the non-native asset data with the reconstructed asset data, and then add the correlated portion to the incident recommendation. For example, in some embodiments, the system may need to add additional information to a generated incident recommendation. The additional information may be context data that aids a user in contextualizing the incident (e.g., the behavior of a user in the asset environment). To perform this, the system may search for time stamp data corresponding to non-native asset data and match the time-stamp of the non-native asset data to a time-stamp of the native asset data. In another example, the system may retrieve non-native asset data (e.g., a known identity of another user in the asset environment) from a social media network. The system may supplement the reconstructed data to indicate the social media identity of one or more users in the asset environment. By doing so, the incident recommendation may include additional information (e.g., a social network relationship between to users that may affect the detection of an incident).

It is contemplated that the steps or descriptions of FIG. 7 may be used with any other embodiment of this disclosure. In addition, the steps and descriptions described in relation to FIG. 7 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-3 could be used to perform one of more of the steps in FIG. 7.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for detecting, reporting, and/or responding to anti-social gameplay in asset environments.
2. A method of detecting incidents based on user behavior, the method comprising: generating a first feature input based on training data comprising telemetry data and/or contextual data of a first known incident; labeling the first feature input with the first known incident; training a machine learning model to detect the first known incident based on the labeled first feature input; receiving telemetry data and/or contextual data of user behavior; generating a third feature input based on the telemetry data and/or contextual data of the user behavior; inputting the third feature input into the trained machine learning model; and receiving an output from the trained machine learning model indicating whether the telemetry data and/or contextual data of the user behavior corresponds to the first known incident.
3. A method for generating incident recommendations in processed data using machine learning models, the method comprising: receiving native asset data; extracting telemetry data from the native asset data; storing the telemetry data; detecting an incident based on an output from a machine learning model, wherein the machine learning model is trained to detect known incidents in training data comprising labeled telemetry data; in response to detecting the incident, generating reconstructed asset data based on the telemetry data; and generating for presentation, in a user interface, an incident recommendation comprising the reconstructed asset data.
4. The method of any of the preceding claims, further comprising: retrieving non-native asset data; correlating a portion of the non-native asset data with the reconstructed asset data; and adding the correlated portion to the incident recommendation.
5. The method of any of the preceding claims, wherein the native asset data include social network data indicating a relationship between a first user and a second user involved in the incident, and wherein the machine learning model uses the relationship to detect the incident.
6. The method of any of the preceding claims, wherein the telemetry data indicates a behavior, action, and/or state of one or more users in an in-asset environment corresponding to the asset data.
7. The method of any of the preceding claims, further comprising: retrieving asset-specific data from the asset data; determine an asset type based on the asset-specific data; and determine a type of telemetry data to extract based on the asset type.
8. The method of any of the preceding claims, further comprising: retrieving asset-specific data from the asset data; determine an asset type based on the asset-specific data; and determine a frequency to pull the asset data from a data source based on the asset type.
9. The method of any of the preceding claims, further comprising: determining a data storage period for a data source of the asset data; and determine a frequency to pull the asset data from the data source based on the data storage period.
10. The method of any of the preceding claims, further comprising: retrieving asset-specific data from the asset data; determine an asset type based on the asset-specific data; and determine an amount of down-sampling of the telemetry data based on the asset type.
11. The method of any of the preceding claims, further comprising: retrieving user-specific data for a first user; determine an incident sampling frequency based on known incidents in the user-specific data; and sampling the telemetry data at the incident sampling frequency.
12. The method of any of the preceding claims, further comprising: retrieving user-specific data for a first user; randomly determining an incident sampling frequency; and sampling the telemetry data at the incident sampling frequency.
13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

What is claimed is:

1. A system for detecting incidents in processed data using machine learning models, the system comprising:
   storage circuitry configured to store:
      a cross-platform profile comprising a single profile for a user that is used across multiple assets; and
      a machine learning model, wherein the machine learning model is trained to detect known incidents in training data comprising labeled telemetry data;
   control circuitry configured to:
      receive native asset data, wherein the native asset data comprises asset data presented to a user during a user's interaction with an asset;
      extract telemetry data from the native asset data, wherein the telemetry data indicates a behavior, action, and/or state of one or more users in an in-asset environment corresponding to the asset data;
      store the telemetry data;
      retrieve user-specific data for a first user;
      determine an incident sampling frequency based on known incidents in the user-specific data;
      sample the telemetry data at the incident sampling frequency;
      detect an incident based on an output from the machine learning model, wherein the incident is an event in an asset related to the user's behavior;
      in response to detecting the incident, generate reconstructed asset data based on the telemetry data; and
   input/output circuitry configured to generate for presentation, in a user interface, an incident recommendation, in the cross-platform profile for the user, comprising the reconstructed asset data.

2. A method for detecting incidents in processed data using machine learning models, the method comprising:
   receiving native asset data;
   extracting telemetry data from the native asset data;
   storing the telemetry data;
   detecting an incident based on an output from a machine learning model, wherein the machine learning model is trained to detect known incidents in training data comprising labeled telemetry data;
   in response to detecting the incident, generating reconstructed asset data based on the telemetry data;
   retrieving non-native asset data;
   correlating a portion of the non-native asset data with the reconstructed asset data; and
   generating for presentation, in a user interface, an incident recommendation comprising the reconstructed asset data and the correlated portion.

3. The method of claim 2, wherein the native asset data include social network data indicating a relationship between a first user and a second user involved in the incident, and wherein the machine learning model uses the relationship to detect the incident.

4. The method of claim 2, wherein the telemetry data indicates a behavior, action, and/or state of one or more users in an in-asset environment corresponding to the native asset data.

5. The method of claim 2, further comprising:
   retrieving asset-specific data from the native asset data;
   determining an asset type based on the asset-specific data; and
   determining a type of telemetry data to extract based on the asset type.

6. The method of claim 2, further comprising:
   retrieving asset-specific data from the native asset data;
   determining an asset type based on the asset-specific data; and
   determining a frequency to pull the native asset data from a data source based on the asset type.

7. The method of claim 2, further comprising:
   determining a data storage period for a data source of the native asset data; and
   determining a frequency to pull the native asset data from the data source based on the data storage period.

8. The method of claim 2, further comprising:
   retrieving asset-specific data from the native asset data;
   determining an asset type based on the asset-specific data; and
   determining an amount of down-sampling of the telemetry data based on the asset type.

9. The method of claim 2, further comprising:
   retrieving user-specific data for a first user;
   determining an incident sampling frequency based on known incidents in the user-specific data; and
   sampling the telemetry data at the incident sampling frequency.

10. The method of claim 2, further comprising:
    retrieving user-specific data for a first user;
    randomly determining an incident sampling frequency; and
    sampling the telemetry data at the incident sampling frequency.

11. A non-transitory, computer-readable medium for detecting incidents in processed data using machine learning models, comprising instructions that, when executed by one or more processors, cause operations comprising:
    receiving native asset data;
    extracting telemetry data from the native asset data;
    storing the telemetry data;
    detecting an incident based on an output from a machine learning model, wherein the machine learning model is trained to detect known incidents in training data comprising labeled telemetry data;
    generating reconstructed asset data based on the telemetry data in response to detecting the incident;
    retrieving non-native asset data;
    correlating a portion of the non-native asset data with the reconstructed asset data; and
    generating for presentation, in a user interface, an incident recommendation comprising the reconstructed asset data and the correlated portion.

12. The non-transitory, computer-readable medium of claim 11, wherein the native asset data include social network data indicating a relationship between a first user and a second user involved in the incident, and wherein the machine learning model uses the relationship to detect the incident.

13. The non-transitory, computer-readable medium of claim 11, wherein the telemetry data indicates a behavior, action, and/or state of one or more users in an in-asset environment corresponding to the native asset data.

14. The non-transitory, computer-readable medium of claim 11, wherein the instructions further cause operations comprising:
    retrieving asset-specific data from the native asset data;

determining an asset type based on the asset-specific data; and determining a type of telemetry data to extract based on the asset type.

15. The non-transitory, computer-readable medium of claim 11, wherein the instructions further cause operations comprising:

retrieving asset-specific data from the native asset data;

determining an asset type based on the asset-specific data; and determining a frequency to pull the native asset data from a data source based on the asset type.

16. The non-transitory, computer-readable medium of claim 11, wherein the instructions further cause operations comprising:

determining a data storage period for a data source of the native asset data; and determining a frequency to pull the native asset data from the data source based on the data storage period.

17. The non-transitory, computer-readable medium of claim 11, wherein the instructions further cause operations comprising:

retrieving asset-specific data from the native asset data;

determining an asset type based on the asset-specific data; and determining an amount of down-sampling of the telemetry data based on the asset type.

18. The non-transitory, computer-readable medium of claim 11, wherein the instructions further cause operations comprising:

retrieving user-specific data for a first user;

determining an incident sampling frequency based on known incidents in the user-specific data; and sampling the telemetry data at the incident sampling frequency.

19. A method comprising:
receiving native asset data;
retrieving asset-specific data from the native asset data;
determining an asset type based on the asset-specific data;
extracting and storing telemetry data from the native asset data by determining an amount of down-sampling of the telemetry data based on the asset type;
detecting an incident based on an output from a machine learning model, wherein the machine learning model is trained to detect known incidents in training data comprising labeled telemetry data;
in response to detecting the incident, generating reconstructed asset data based on the telemetry data; and
generating for presentation, in a user interface, an incident recommendation comprising the reconstructed asset data.

20. A non-transitory, computer-readable medium comprising instructions that, when executed by one or more processors, cause operations comprising:
receiving native asset data;
retrieving asset-specific data from the native asset data;
determining an asset type based on the asset-specific data;
extracting and storing telemetry data from the native asset data by determining an amount of down-sampling of the telemetry data based on the asset type;
detecting an incident based on an output from a machine learning model, wherein the machine learning model is trained to detect known incidents in training data comprising labeled telemetry data;
generating reconstructed asset data based on the telemetry data in response to detecting the incident; and
generating for presentation, in a user interface, an incident recommendation comprising the reconstructed asset data.

21. A method comprising:
receiving native asset data;
retrieving user-specific data for a first user;
randomly determining an incident sampling frequency;
sampling telemetry data from the native asset data at the incident sampling frequency;
storing the telemetry data;
detecting an incident based on an output from a machine learning model, wherein the machine learning model is trained to detect known incidents in training data comprising labeled telemetry data;
in response to detecting the incident, generating reconstructed asset data based on the telemetry data; and
generating for presentation, in a user interface, an incident recommendation comprising the reconstructed asset data.

22. A non-transitory, computer-readable medium comprising instructions that, when executed by one or more processors, cause operations comprising:
receiving native asset data;
retrieving user-specific data for a first user;
randomly determining an incident sampling frequency;
sampling telemetry data from the native asset data at the incident sampling frequency;
storing the telemetry data;
detecting an incident based on an output from a machine learning model, wherein the machine learning model is trained to detect known incidents in training data comprising labeled telemetry data;
generating reconstructed asset data based on the telemetry data in response to detecting the incident; and
generating for presentation, in a user interface, an incident recommendation comprising the reconstructed asset data.

* * * * *